United States Patent [19]
Heydolph

[11] 4,144,831
[45] Mar. 20, 1979

[54] NAUTICAL MOORING APPARATUS

[76] Inventor: Fred R. Heydolph, 2634 SE. 14th St., Pompano Beach, Fla. 33062

[21] Appl. No.: 838,102

[22] Filed: Sep. 30, 1977

[51] Int. Cl.² ............................................. B63B 21/00
[52] U.S. Cl. ................................... 114/230; 403/166; 403/315
[58] Field of Search ....................... 114/230, 249, 250; 403/166, 315, 319; 280/493, 494

[56] References Cited
U.S. PATENT DOCUMENTS

| | | | |
|---|---|---|---|
| 2,268,181 | 12/1941 | Bolton | 280/493 |
| 2,798,448 | 7/1957 | Hale | 114/249 |
| 3,139,852 | 7/1964 | Morris | 114/230 |

Primary Examiner—Trygve M. Blix
Assistant Examiner—Sherman D. Basinger

Attorney, Agent, or Firm—Robert D. Farkas

[57] ABSTRACT

A nautical boat mooring apparatus which includes a rigid open-ended tubular member which forms a longitudinal open-ended chamber therein, a piston assembly providing a piston slideably positionable within the longitudinal open-ended chamber and a rod portion, the rod portion being extensible out of one end of the longitudinal chamber, a first spring for urging the piston toward the second end of the tubular member, a second spring for urging the piston toward the first end of the tubular member, a first coupling device for removably affixing the first end of the tubular member to a supporting surface, and a second device for removably affixing another portion of the piston assembly to a nautical vessel. Both coupling devices employ ball and socket arrangements to permit the apparatus to accommodate yaw, roll and pitch of the vessel.

5 Claims, 8 Drawing Figures

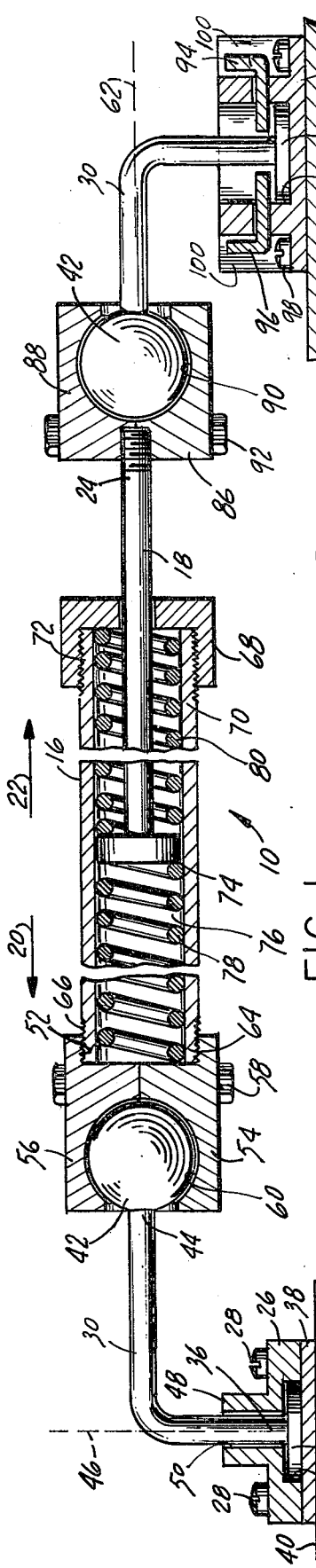
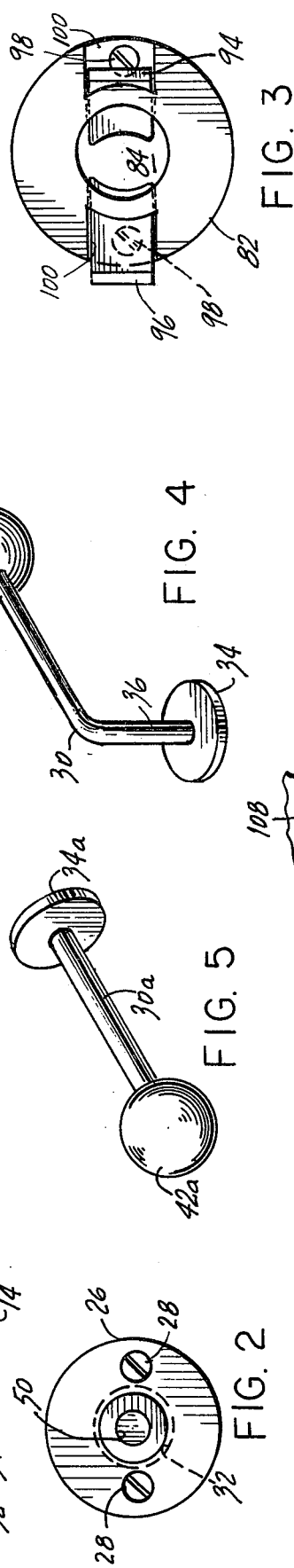
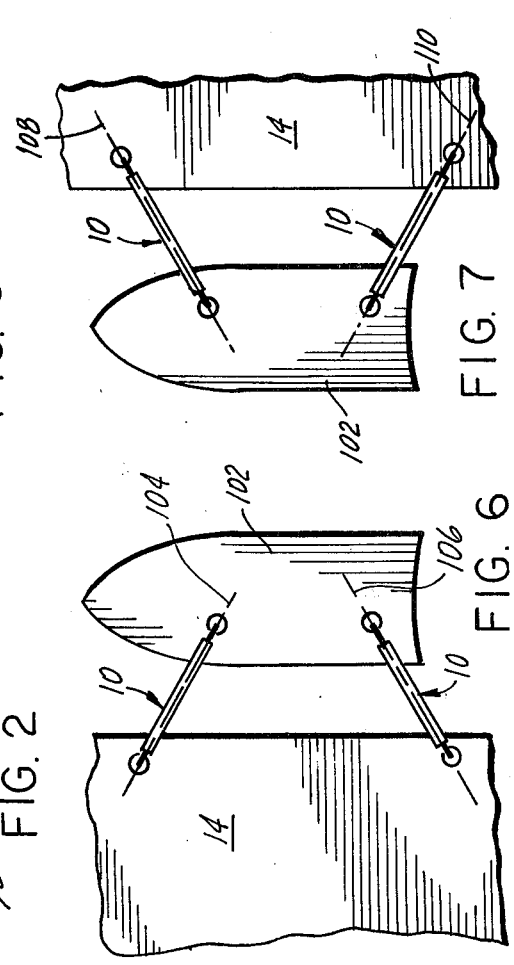

NAUTICAL MOORING APPARATUS

BACKGROUND OF THE INVENTION

1. Field of the Invention

The present invention relates to the docking of nautical vessels, and more particularly, to extensible nautical mooring apparatus.

2. Description of the Prior Art

The problem of securing nautical vehicles to docks or the like is well known in the art. The primary concern is to secure the vehicle in position adjacent to the dock while allowing for changes in water level, turbulence, and weather conditions while simultaneously preventing the craft from smashing into the dock. Damage to both the craft and the dock are possible if the craft is not properly secured. Several devices in the prior art propose boat mooring apparatuses which must be employed in pairs to effectively secure a nautical craft. The reason these prior art boat mooring apparatuses must be used in pairs is that such apparatuses permit almost limitless movement of the craft at a fixed distance from the dock therefore requiring securement at at least two positions, even though they still permit damage to the craft due to impact against a dock and the like. Thus, bumpers were required to prevent impact while the prior art devices tended to prevent the vessel from being displaced from the dock side.

U.S. Pat. No. 3,064,615 issued to D. Waltman on Nov. 20, 1962 discloses a boat mooring device which includes a coil spring having an eye affixed to one end thereof, the eye being suitable for attaching the spring to a dock, a rod fixed to the other end of the spring and projecting perpendicularly to the axis thereof, and a bracket defining an aperture for receiving the rod, the bracket being adapted for attachment to the side of a boat or the like, with the aperture extending vertically.

U.S. Pat. No. 3,157,150 issued to J. Faber, Jr. on Nov. 17, 1964 teaches a mooring apparatus which includes a bracket for affixment to a dock or the like, a substantially horizontally extensive rod affixed on one end thereof to a bracket, and a spring affixed to the other end of the horizontally extensive bracket, the free end of the spring for removable affixment to a bracket adapted to be mounted on a nautical craft. Free rotation of the craft is permitted about the spring.

These and other devices disclosed in the prior art employ piston type assemblies to deter the movement of a moored craft. The springs of these piston assemblies provide a dampening action when in compression, but intensify and increase the speed of unwarranted movement when in expansion.

The present invention overcomes the problems associated with the prior art by providing a nautical mooring apparatus which may be employed to effectively moor a nautical vehicle adjacent to a dock or the like, providing an improved dampening action and a convenient way to fasten the device to the dock and vessel whilst permitting the vessel to pitch and yaw and roll without stressing the inventive device.

SUMMARY OF THE INVENTION

Therefore, a primary object of the present invention is to provide a nautical mooring apparatus which provides an improved dampening action to preclude the engagement of a nautical vehicle with a dock or the like during mooring.

A further object is to provide a nautical mooring apparatus which may be employed simply and easily to moor a nautical craft.

Still another object is to provide a nautical mooring apparatus which may be employed to keep a nautical craft a preselected distance from a dock or the like while permitting a certain degree of vertical and angular movement of the craft with the waves, wind and rise and fall of the water level.

Another object of the present invention is to provide a nautical mooring apparatus which is ideally suited for use with small lightweight crafts.

Another object is to provide a nautical mooring apparatus wherein the principal portion thereof is swivelable and removably anchored to a dock or the like and need not be carried unnecessarily on the nautical craft where space may be at a minimum.

Another object is to provide a nautical mooring apparatus which is simple in design, inexpensive to manufacture, and durable.

According to the principles of the present invention, a nautical mooring apparatus includes a rigid open-ended tubular member having a first end and a second end, the tubular member forming a longitudinal open-ended chamber therein; a piston assembly including a piston and a rod portion fixedly secured thereto, the piston slideable within the longitudinal open-ended chamber, the rod portion coaxially extensible out of the longitudinal chamber through an opening located in the first end of the tubular member; first means for urging the piston toward the second end of the tubular member; second means for urging the piston toward the first end of the tubular member; first means for affixing the first end of the tubular member to a supporting surface; and second means for affixing the rod portion of the piston assembly to a nautical vehicle.

BRIEF DESCRIPTION OF THE DRAWINGS

In order that the present invention may be more fully understood it will now be described, by way of example, with reference to the accompanying drawings in which:

FIG. 1 is a side elevation, cross-sectional view of the present invention.

FIG. 2 is a plan view of an attachment device.

FIG. 3 is a plan view of an alternate embodiment of an attachment device.

FIG. 4 is a perspective view of a coupling device.

FIG. 5 is a perspective view of an alternate embodiment of a coupling device.

FIG. 6 is a plan view of the present invention being utilized mooring a vessel to a dock.

FIG. 7 is a plan view of the present device shown utilized alternately to moor a vessel to a dock.

FIG. 8 is a plan view of the present invention being utilized to secure the stern of a vessel to a dock.

DESCRIPTION OF THE PREFERRED EMBODIMENT

Referring now to the figures and more particularly to FIG. 1 thereof, there is illustrated therein a nautical mooring apparatus 10 shown coupled to a portion of a dock 14 and a portion of a vessel 12, having tube-like element 16, preferably having a cylindrical shape, residing extending horizontally thereinbetween. It should be understood, that tube 16 and piston rod 18 extending outwardly therefrom, may reside at any angle from the horizontal dependent upon a variety of wind, tide and other factors affecting vessel 12. The apparatus is utilized to permit vessel 12 to move inwardly towards dock 14, in the direction of arrow 20, or to move outwardly therefrom, by moving in the direction of arrow 22. This is accomplished by having piston rod 18 move inwardly and outwardly from tube 16. End 24 of piston rod 18 is shown located adjacent vessel 12. Attachment device 26 is shown secured to dock 14 utilizing bolts 28 therefor. Nothing herein contained prohibits end 24 of rod 18 from being coupled to attachment device 26. Coupling rods 30 are shown secured to attachment device 26 and attachment device 82. Attachment device 82 is shown secured to vessel 12. Plate 34 is secured to one end of rod 30 and is shown residing in opening 32 of attachment device 26 and opening 84 of attachment device 82. Plate 34 has circular marginal edges and is attached to end 36 of rod 30. Sub-plate 38, is secured intermediate attachment device 26 and dock 14 so as to prevent the normal surface of circular plate 34 from abrading the upper most surface 40 of dock 14. Ball 42 is secured to end 44 of coupling rod 30 such as by welding. A portion of coupling rod 30, adjacent end 36 thereof is disposed along dotted lines 46, extending vertically and upwardly from dock surface 40. Cylindrical tube-like portion 48 has vertically disposed hole 50 therein so as to enable coupling rod 30 to swivel freely about dotted lines 46. Threads 52 engage blocks 54 and 56 on threaded end 64 of tube 16. Bolt 58 joins blocks 54 and 56 together so as to form spherical opening 60. Ball 42 resides in spherical opening 60 so as to form a conventional ball and socket arrangement. As shown, piston rod 18 is concentrically aligned with dotted lines 62, extending in a horizontal position. Ball 42 of coupling rod 30, having end 34 thereof disposed located in opening 84 of attachment device 82 is similarly constructed to coupling rod 30, disposed connected to attachment apparatus 26. Threads 66, on tube 16 engage threads 64 on blocks 54 and 56. Block 68 utilizes threads 72, located at end 70 of tube 16 to join block 68 to the tube. Piston rod 18 emerges outwardly from block 68. Piston 74, is secured to piston rod 18 and resides slideably within cavity 76 located in tube 16. Springs 78 and 80 are disposed located within cavity 76. Spring 80 resists the ability of piston 74 to move in the direction of arrow 22. Spring 78 resists the ability of piston 74 to move in the direction of arrow 20. Thus, rod 18, is maintained in a stationary position provided that there are no forces acting in opposite directions on end 24 of piston rod 18 and, blocks 54 and 56.

Attachment device 82 is secured to vessel 12 by any convenient means. Blocks 86 and 88 are bolted together utilizing bolt 92 therefor. Threads located at end 24 of piston rod 18 engage blocks 86 and 88. Spherical cavity 90 is disposed within blocks 86 and 88 forming a socket for ball 42 adjacent therewith. Sheets 94 and 96 are slideably affixed to attachment device 92 so that when they are directed inwardly towards coupling rod 30, circular plate 34 is captured within opening 84 therein. When sheets 94 and 96 are pulled outwardly from opening 84 circular plate 34 may be pulled upwardly and outwardly from attachment device 82 facilitating the removal of coupling rod 30. Thus, the present invention may be stored away when not in use and reinstalled into use easily.

FIG. 2 illustrates hole 50 disposed in coaxial alignment with opening 32 and having a smaller diameter.

FIG. 3 illustrates bolts 98 contained within recess 100 disposed below the plane in which sheets 94 and 96 travel when pulled outwardly from opening 84 in attaching device 82. Nothing herein contained restricts the ability of attachment device 82 from being interchanged with attachment device 26 at either end of the present invention 10, shown in FIG. 1. Thus, dock 14 may have a vertical wall portion thereof supporting either attachment device 26 or 82. Conversely, attachment device 82 may be replaced for attachment device 26, as shown in FIG. 1. In likewise fashion, attachment device 26 may be exchanged for attachment device 82 when secured to vessel 12, as shown in FIG. 1. Attachment devices 26 and 82 may be also installed on vertical surfaces of vessel 12, if desired.

FIG. 4 illustrates coupling rod 30 having an L-shaped cross-section including ball 42 at one end and circular plate 34 at the other.

FIG. 5 is an alternate embodiment of a coupling rod 30 A having circular plate 34 A at one end and spherical ball 42 A at the other end, whilst having an elongated straight rod thereinbetween. Nothing herein contained prohibits the interchanging of the embodiment of coupling rods shown in FIG. 5 to be exchanged with the embodiment of the coupling rod shown in FIG. 4 at either end of the present invention 10, as shown in FIG. 1.

FIG. 6 illustrates dock 14 to which vessel 102 is moored, utilizing a pair of mooring apparatuses 10 therefor. The longitudinal axis of mooring apparatuses 10, extend in the direction of dotted lines 104 and 106, wherein dotted lines 104 and 106 tend to converge adjacent the vicinity of vessel 102. Since each mooring device permits a limited motion of vessel 102 towards or away from dock 14, vessel 102 is substantially maintained a given distance apart from dock 14, thereby avoiding the need for bumpers thereinbetween, not shown.

FIG. 7 illustrates vessel 102 utilizing the present invention 10, in a pair, having their longitudinal axes disposed along dotted lines 108 and 110. The standard side of vessel 102 is shown disposed adjacent to dock 14. This effect is accomplished by permitting the present invention 10 to rotate about the attachment devices securing same to vessel 102, from the position shown in FIG. 6. If desired, attachment devices 82, shown in FIG. 1, may be utilized at either end of present invention 10 so as to facilitate removing the mooring device from either or both the dock 14 or vessel 102, at the will of the user.

FIG. 8 illustrates dock 14, having a pair of mooring devices 10 attached thereto coupled to vessel 102 adjacent stern region 112 thereof. Dotted lines 114 and 116 converge in the vicinity of a vessel 102. Dotted lines 114 and 116 are shown skew so as to maintain stern regions 112 a given distance away from dock 14. It is to be noted that dotted lines 114 and 116 may be disposed parallel to one another, or, if desired, located such that they form an acute angle having the apex thereof disposed adjacent to dock 14. In any event, present invention 10 may be utilized wherein combinations of rods 30 and 30 A, shown in FIGS. 4 and 5, may be interchanged with attachment devices 26 and 82, shown in FIG. 1, utilized at either end thereof, and combined secured to, in any desired combination, the vessel 102 or the dock 14 at any selected locations. A pair of attachment devices 26 or a pair of attachment devices 82 may be utilized with a pair of rods 30 or a pair of rods 30 A or any desired combination thereof for each location of the present invention 10.

One of the advantages of the present invention is to provide a nautical mooring apparatus which provides an improved dampening action to preclude the engagement of a nautical vehicle with a dock or the like during mooring.

Another advantage of the present invention is to provide a nautical mooring apparatus which may be employed simply and easily to moor a nautical craft.

Still another advantage of the present invention is to provide a nautical mooring apparatus which may be employed to keep a nautical craft a preselected distance from a dock or the like while permitting a certain degree of vertical and angular movement of the craft with the waves, wind and rise and fall of the water level.

Yet another advantage of the present invention is to provide a nautical mooring apparatus which is ideally suited for use with small lightweight crafts.

A further advantage of the present invention is to provide a nautical mooring apparatus wherein the principal portion thereof is swivelable and removably anchored to a dock or the like and need not be carried unnecessarily on the nautical craft where space may be at a minimum.

Another advantage of the present invention is to provide a nautical mooring apparatus which is simple in design, inexpensive to manufacture, and durable.

I claim:

1. A nautical mooring apparatus comprising a rigid open-ended tubular member having a first end and a second end, said tubular member forming a longitudinal open-ended chamber therein, a piston assembly including a piston and a rod portion fixedly secured thereto, said piston slideable within said longitudinal chamber, said rod portion coaxially extensible out of said longitudinal chamber through an opening located in said second end of said tubular member, first means for urging said piston toward said second end of said tubular member, second means for urging said piston toward said first end of said tubular member, first means for affixing said first end of said tubular member to a supporting surface, said first affixing means including a first rod rotatably affixed on a first end thereof to a first bracket, said first bracket for affixment to said supporting surface, the second end of said first rod providing a ball-shaped element, and a first cap fixedly secured to said tubular member adjacent said first end thereof, said first cap providing a capturing chamber therein, said capturing chamber capturing said ball-shaped element and permitting angular movement of said second end of said first rod relative to said supporting surface, and second means for affixing said rod portion of said piston assembly to a nautical vehicle, said second affixing means including a second bracket for affixment on one end thereof to said nautical vehicle, a second rod, one end of said second rod pivotally removably affixed to said bracket the other end of said second rod affixed to a ball, a cap, said cap having a hemispherical cavity and said cavity extending to an external surface of said cap, said cap secured to the free end of said rod portion, said second bracket having an aperture therein, a plate, said plate fixedly secured to said one end of said second rod, said plate having circular marginal edges, a sheet-like member, said sheet-like member slideably affixed to said second bracket at a plane normal to the longitudinal axis of said aperture, whereby said plate is rotatably locked into said aperture when said sheet-like member is disposed partially juxtaposed with said plate, wherein said first and said second affixing means permits movement of the longitudinal axis of said tubular member angularly relative to a horizontal plane.

2. A nautical mooring apparatus as claimed in claim 1, wherein said first urging means comprises a first helical compression spring disposed within said longitudinal chamber between said first end thereof and said piston.

3. A nautical mooring apparatus as claimed in claim 1, wherein said second urging means comprises a second helical compression spring disposed within said longitudinal chamber between said second end thereof and said piston.

4. A nautical mooring apparatus as claimed in claim 3, wherein said rod portion extends through said second helical compression spring.

5. A nautical mooring apparatus as claimed in claim 1, wherein said second rod is L-shaped.

* * * * *